United States Patent
Egner et al.

(10) Patent No.: US 10,142,937 B2
(45) Date of Patent: Nov. 27, 2018

(54) INFORMATION HANDLING SYSTEM MESH NETWORK POWER MANAGEMENT

(71) Applicant: Dell Products L.P., Round Rock, TX (US)

(72) Inventors: Will A. Egner, Cedar Park, TX (US); Christophe Daguet, Round Rock, TX (US); Mohammed K. Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 15/082,135

(22) Filed: Mar. 28, 2016

(65) Prior Publication Data

US 2017/0280435 A1    Sep. 28, 2017

(51) Int. Cl.
*H04W 52/02* (2009.01)
*H04W 40/10* (2009.01)
*H04W 84/18* (2009.01)

(52) U.S. Cl.
CPC ....... *H04W 52/0261* (2013.01); *H04W 40/10* (2013.01); *H04W 84/18* (2013.01); *Y02D 70/142* (2018.01); *Y02D 70/144* (2018.01); *Y02D 70/22* (2018.01)

(58) Field of Classification Search
CPC ........... H04W 72/048; H04W 52/0261; H04W 48/08; H04W 84/18
See application file for complete search history.

(56) References Cited

U.S. PATENT DOCUMENTS

| | | | |
|---|---|---|---|
| 9,088,859 B2 | 7/2015 | Egner et al. | |
| 9,226,295 B2 * | 12/2015 | Negus | H04J 1/00 |
| 9,313,603 B2 | 4/2016 | Egner et al. | |
| 2007/0087756 A1 * | 4/2007 | Hoffberg | G06Q 10/0631 |
| | | | 455/450 |
| 2011/0019560 A1 * | 1/2011 | Karaoguz | H04L 45/125 |
| | | | 370/252 |
| 2011/0045767 A1 * | 2/2011 | Rofougaran | H04B 7/2606 |
| | | | 455/16 |
| 2015/0056960 A1 * | 2/2015 | Egner | H04W 12/08 |
| | | | 455/411 |

OTHER PUBLICATIONS

Will A. Egner et al., U.S. Appl. No. 15/065,539, filed Mar. 9, 2016, entitled "Method and Apparatus for Connection Context Aware Radio Communication Management,".

* cited by examiner

*Primary Examiner* — Andrew Lai
*Assistant Examiner* — Harry H Kim
(74) *Attorney, Agent, or Firm* — Zagorin Cave LLP; Robert W. Holland

(57) ABSTRACT

A portable information handling system includes a wireless network interface device that establishes communication with a network destination through a mesh network having plural network paths of one or more ad hoc network interfaces. A mesh network manager running on the portable information handling system retrieves network context information from nodes of the plural network paths and applies the network context information to determine energy consumption of the plural network paths. The mesh network manager selects a network path to communicate with the network destination based at least in part on the energy consumption associated with the plural network paths.

14 Claims, 4 Drawing Sheets

INFORMATION HANDLING SYSTEM MESH NETWORK POWER MANAGEMENT

BACKGROUND OF THE INVENTION

Field of the Invention

The present invention relates in general to the field of information handling system network communications, and more particularly to information handling system mesh network power management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems empower end users to perform processing tasks on-the-go by integrating power, display and input/output resources into a portable housing. End users take advantage of such portability in an enterprise environment to move between locations for meetings with team members. End users essentially bring their office with them by having the information handling system available and interfaced with a wireless enterprise network. Wireless network communications provide access to email and enterprise data in real time, such as through 802.11 (b, g, n, a, ac and ax (in development)) compliant interfaces. Such interfaces generally operate in the 2.4 GHz and 5 GHz frequency bands to support communication throughout a typical enterprise structure, such as 100 meters in a typical office building. A typical enterprise office will deploy multiple wireless access points (APs) throughout an office environment that support portable information handling system network communications. The APs are typically interfaced with Ethernet cabling and switches to communicate with server information handling systems that coordinate information flow.

Although APs are generally effective at supporting enterprise wireless communication needs, AP deployment and support comes at a cost. APs are installed and maintained in various locations of the enterprise environment, typically at elevated locations, such as at ceiling beams. Ethernet wiring and switches are deployed to support interactions between the APs. The physical infrastructure requires power and maintenance to ensure reliable operation. The APs typically remain on at all times to monitor for user requests so that power consumption during inactivity, such as after office hours, can add up. The wireless communications require channel control to manage radio signal interference between APs and multiple portable information handling systems that share the wireless networking bandwidth. End users often experience wide variations in network communication speed and reliability depending on the relative position of portable information handling systems and APs. For example, an AP in the area of a large meeting may become congested so that users in the area have intermittent service or, in some cases, no service at all.

One alternative to reliance on distributed APs is to provide shorter range wireless networking solutions at end user work spaces, such as docking stations that have high bandwidth 60 GHz wireless interfaces. One example is a WiGig interface that includes wireless local area network (WLAN) support compliant with 802.11 (ad and ay (in development)). The 60 GHz interface offers rapid data transfer over typical desktop ranges, such as ten to thirty meters, to support high bandwidth use cases, such as wireless display interfaces and video streaming. The shorter range of the 60 GHz wireless signal reduces interference in an enterprise environment and uses less power than longer range wireless local area network interfaces. If a docking station includes a hardwire Ethernet connection, the user has ready access to server resources as needed by routing WLAN communications through Ethernet based local area network (LAN) communications. However, the shorter range of WiGig 60 GHz WLAN tends to restrict communications during movement of the portable information handling system. In some situations, information handling systems coordinate communication in a mesh network that interfaces an information handling system with an access point by relaying network communications through a series of ad hoc or peer-to-peer interfaces. Such mesh networks through high bandwidth WLANs may offer enhanced network communication speeds, however, reliability of the interface and power consumption by the networking devices are important considerations for selecting a network path to perform communications. In some situations, the network path may include various combinations of 60 GHz, 5 Ghz and 2.4 Ghz communication links. In some instances, the network path may include network nodes that do not communicate with WLANs, such as nodes that communicate with wireless wide area networks (WWAN) supported by mobile telephone service providers or even wireless personal area network (WPAN) interfaces like Bluetooth.

U.S. Pat. No. 9,088,859, entitled "Method and Apparatus for Connection Context Aware Radio Communication Management," by Egner et al., and incorporated herein by reference as if fully set forth, discloses selection of a network path by an information handling system for establishing communication through a mesh network of peer-to-peer interfaces to a network location. Once available mesh network paths are determined, the available network paths are analyzed to select a network path for establishing communication. For example, the available network paths are compared to select a network path having acceptable quality of service (QoS) for the communication needs of the information handling system. For example, QoS context across the nodes of each network path are aggregated and compared to select the network path having the best available QoS.

SUMMARY OF THE INVENTION

Therefore, a need has arisen for a system and method which provides an information handling system mesh network having power consumption management.

In accordance with the present invention, a system and method are provided which substantially reduce the disadvantages and problems associated with previous methods and systems for rotationally coupling portable information handling system housing portions to each other. A portable information handling system wireless network interface device selects from between plural available mesh network paths based at least in part upon a comparison of energy consumption parameters associated with each of the plural available mesh network paths. The present invention allows intermediate portable devices to the extend the communication of other devices in an enterprise or office environment when an internal battery charge state is adequate while not participating to support mesh networks when the internal battery state has an inadequate charge state that would drain battery resources below an acceptable level.

More specifically, a portable information handling system processes information with processing components disposed in a portable housing, such as a central processing unit (CPU) and memory. A wireless network interface device interfaced with the processing components supports wireless network communication of the information to a network destination through a mesh network of plural wireless networking nodes, such as APs or docking stations that support WLAN communication, or other types of network interfaces. A mesh network manager running on the portable information handling system, such as a firmware module running on a chipset processor or controller, determines mesh network paths available for communication of information and selects a mesh network path based at least on power consumption parameters associated with communication through the each of the available mesh network paths. For example, the mesh network manager retrieves network context information from nodes of each available mesh network and applies the network context information to estimate an energy consumption profile for each mesh network path. In one example embodiment, energy consumption parameters may include additional energy associated with information encryption where network context calls for encryption to meet desired security constraints. In another example embodiment, energy consumption parameters may include whether nodes of an available network path has battery or external power. Energy consumption profile is applied among other mesh network path profile constraints to select a network path for communication of information, such as by weighing available bandwidth, network latency, power consumption, security and other factors.

The present invention provides a number of important technical advantages. One example of an important technical advantage is that in an enterprise network environment, power consumption is reduced to support network communication in a secure manner that provides end users with adequate network performance. Network nodes are leveraged to provide optimal network performance while incremental increases in energy efficiency results in power savings for an enterprise that implements management based on energy consumption goals. Network management actively adjusts to changing enterprise conditions and end user network needs without active interactions by the end user to provide improved quality of service with reduced power consumption at system and enterprise levels. Enterprise network environments provide improved end user experience with reduced access point footprints, reduced information technology operational and capital expenditures, reduced energy consumption and service cost, improved network resiliency, increased reliability and an extended network connectivity range. Further, individual nodes that have limited power resources, such as operating on battery power, will not stress the power resources where power source is considered as part of the power consumption parameters for the nodes of network paths available for selection.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Portable information handling systems select a mesh network path to communicate with a network destination from plural available mesh network paths based at least in part upon energy consumption parameters of the plural available mesh network paths. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
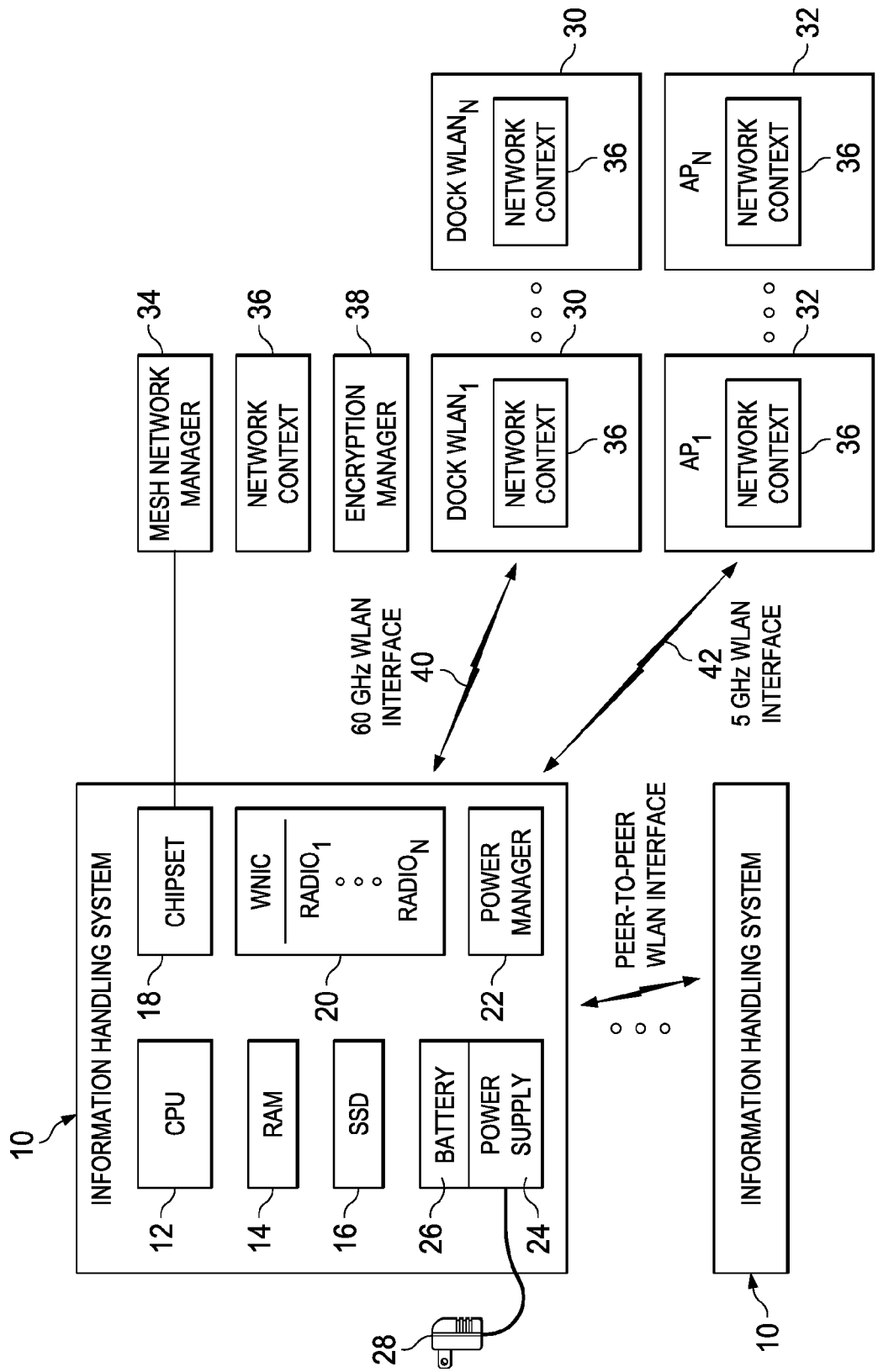
FIG. 1 depicts a block diagram of a portable information handling system interfaced through a mesh network selected based in part upon power consumption.

Referring now to FIG. 1, a block diagram depicts a portable information handling system 10 interfaced through a mesh network selected based in part upon power consumption parameters. Portable information handling system 10 processes information with a central processing unit (CPU) 12 that executes instructions stored in memory, such as random access memory (RAM) 14. Applications stored in persistent memory, such as solid state drive (SSD) 16 are retrieved to RAM 14 under coordination of various processing resources and firmware of a chipset 18, which coordinates interaction of processing components on a physical level. A wireless network interface card (WNIC) 20 includes plural radios that provide wireless networking, such as through WLAN, WWAN and WPAN interfaces. For example, wireless network interface card (WNIC) 20 supports 2.4 GHz, 5 GHz and 60 GHz WLAN radio communications as envisioned by the WiGig Alliance. A power manager 22 manages power resources for powering the processing components, such as power provided by an integrated power supply 24 and/or an integrated battery 26. An external power source 28 provides external AC power to power supply 24 for conversion to a DC power source that is used by power manager 22 to power the processing components or charge battery 26.

Portable information handling system 10 selectively establishes network interfaces with external WLAN, WWAN and/or WPAN network resources through WNIC 20. In the example embodiment, a docking station 30 includes a WLAN networking resource for providing a 60 GHz WiGig WLAN interface 40, and an AP 32 includes a WLAN networking resource for providing a 5 GHz or 2.4 GHz WLAN interface 42. A mesh network manager 34 included in chipset 18 or WNIC 20 monitors available networking resources and selects network resources to establish an interface with a network destination through a mesh of ad hoc network communications. For example, available mesh network paths are determined as set forth in U.S. Pat. No. 9,088,859 described above and incorporated herein so that a selection of a mesh network path may be performed. Mesh network paths to a network destination, such as an enterprise server, may include ad hoc peer-to-peer network interfaces with other information handling systems 10, docking stations 30, APs 32 or other networking resources, such as display peripherals that include WiGig capabilities. An encryption manager 34 cooperates with mesh network manager 34 to encrypt mesh network interfaces as needed based upon security attributes of the network interface, such as based upon an analysis of the network context for the selected network path.

In the example embodiment, mesh network manager 34 retrieves network context information 36 from the nodes of each mesh network path and applies the network context information to select a mesh network path for communication with a network destination. For example, the network context for each node is provided through an advertisement of the node's network context. The network context is aggregated for each network path so that a comparison of suitability may be performed between available network paths based upon the aggregated network context. Once network manager 34 has determined available mesh network paths, both experience criteria and connection cost are determined from the network context information to select an optimal network path. Experience criteria includes quality of service, such as bandwidth compared with data communication needs and network latency, etc. Connection cost includes energy consumption, service cost and security attributes for each available mesh network path. Mesh network manager 34 selects a mesh network interface to a network anchor aggregator, such as an Internet of Things (IoT) hub or WLAN AP that provides adequate experience criteria with the least connection cost. For example, if two available mesh networks provide adequate experience criteria, mesh network manager 34 selects the mesh network that uses the least amount of power to maintain a network interface. The determination of energy consumption may include power used at each mesh network node, increased power consumption associated with processing to perform encryption if required, and the availability of external power versus battery power for nodes in the available mesh network paths.

Figure 2:
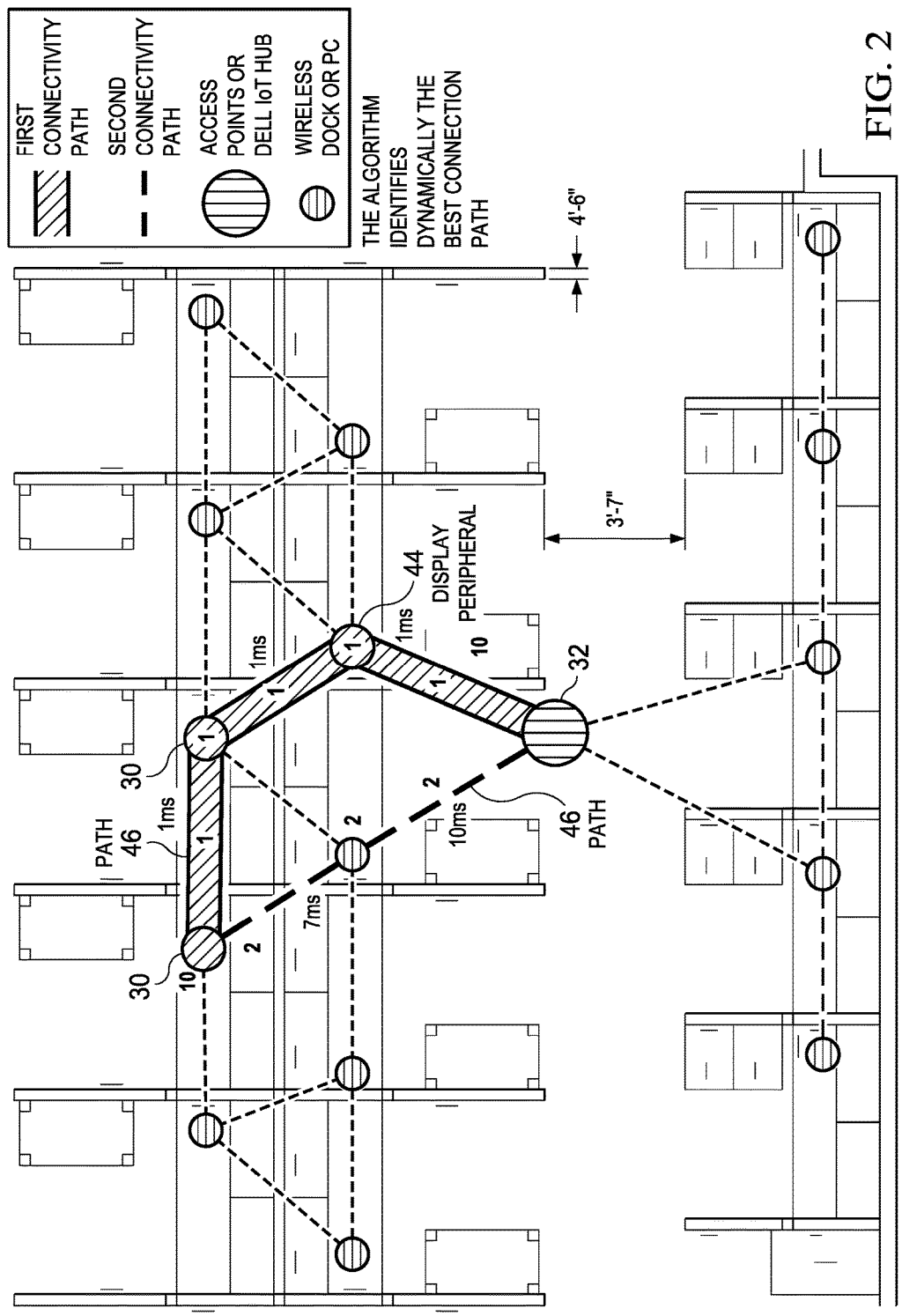
FIG. 2 depicts an enterprise environment having plural network paths available for selection by a portable information handling system.

Referring now to FIG. 2, an enterprise environment is depicted having plural network paths 46 available for selection by a portable information handling system 10. In the example embodiment, a first (1) network path 46 proceeds from a portable information handling system 10 through a docking station 30, a display peripheral 44 and to a WAP 32 with a total latency of 3 mSec. A second (2) network path 46 proceeds from portable information handling system 10 through a docking station 30 and to WAP 32 with a total latency of 17 mSec. Network path (1) provides a better experience with a reduced latency for more rapid data transfer. The 60 GHz WiGig interfaces provided by docking stations 30 of network path (1) provide a substantial bandwidth that supports rapid transfers for data intensive operations, such as data streaming. Without consideration of energy consumption, mesh network manager 34 selects network path (1) to establish a network interface that provides an optimal user experience. However, sending data through multiple network nodes also tends to increase power consumption as each network node processes and retransmits data. In contrast, the single network node of network path (2) has a reduced energy consumption that is preferable where the lower data transfer rates and increased latency are acceptable. Mesh network manager 34 will select network path (2) in such situations and transition to network path (1) as needed to accomplish higher data transfer rates with greater energy expenditure, such as if an end user transitions from low-data activities like web browsing to high data activities like video streaming.

In order to optimize network path selection, mesh network manager 34 retrieves network context information relating to power consumption of nodes for each network path and analyzes energy consumption at the portable information handling system. Once competitive network paths are identified that provide adequate user experience, a delta score for the competitive paths is determined and compared to select the network path that has less power consumption. The cost of a particular network path hop is a function of the amount of energy remaining on the device and the energy required to transmit the data. In one example embodiment, the total energy associated with a network path is the sum of energy consumed at each network node adjusted for the availability of external power or the availability of only battery power. For example, each node's energy score is determined as the energy to transmit a packet through the node divided by the percentage of battery remaining (if external power is not available) plus any additional energy related to encryption if required by the security context of the network interface. Where the delta for user experience between two network paths is not distinguishable by an end user, selection of network paths based on energy consumption is performed. Information technology administrators can adjust the selection criteria to adapt network path selection to a particular environment or enterprise goal. For instance, to preserve battery store on individual information handling systems, a bias against selection of network paths through information handling systems may be implemented that rejects the use of nodes operating only on battery power or having less than a predetermined battery charge store.

Figure 3:
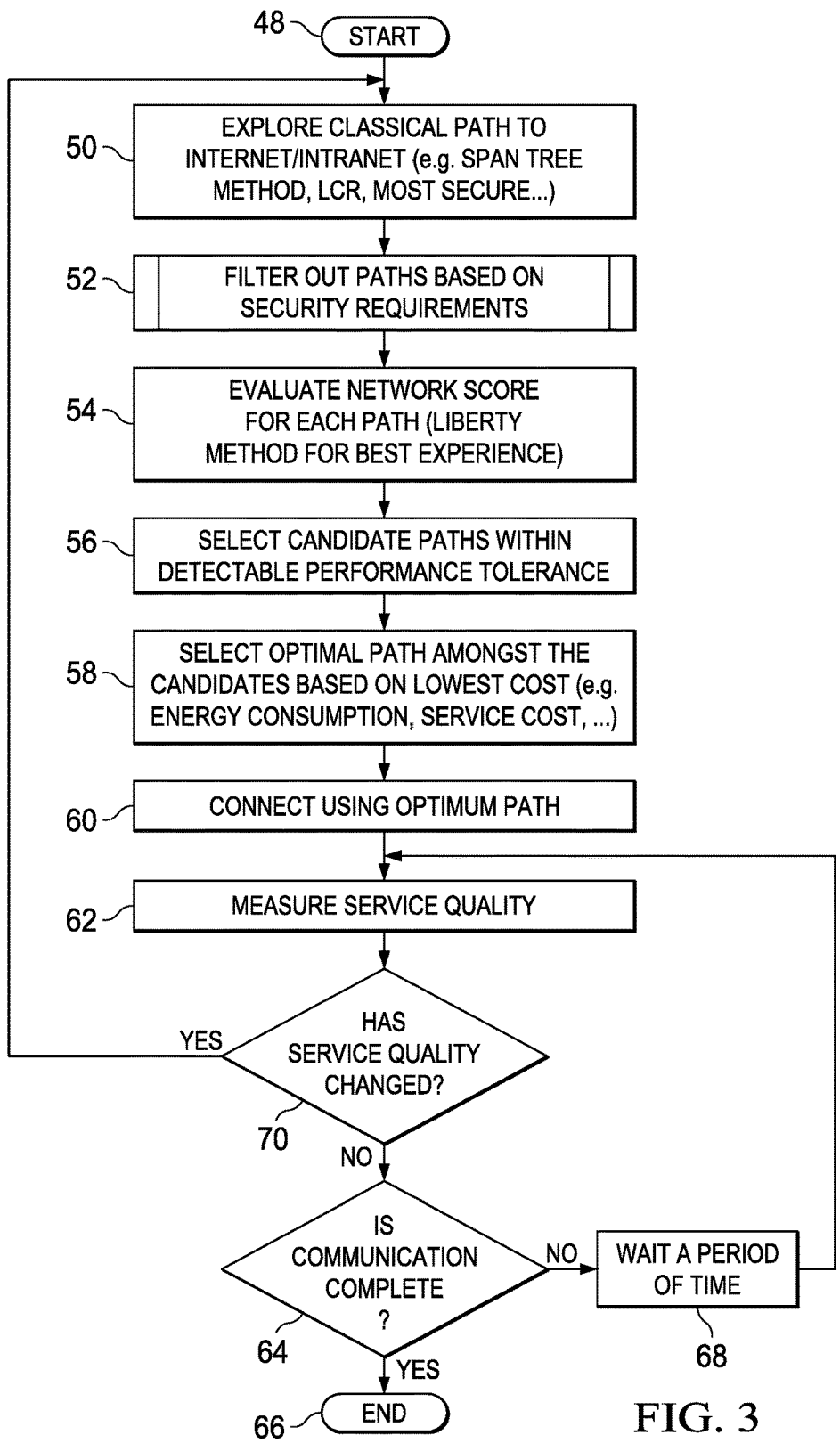
FIG. 3 depicts a flow diagram of a process for selecting a mesh network path based upon energy consumption.

Referring now to FIG. 3, a flow diagram depicts a process for selecting a mesh network path based upon energy consumption parameters. The process starts at step 48 and at step 50 performs an analysis to identify available network paths based upon user experience, such as with a span tree analysis, and LCR analysis, a security analysis, etc. At step 52, available network paths are filtered based upon security requirements, such as by eliminating paths that include nodes having inadequate security. At step 54, the available network paths are evaluated for a network delta score to determine the relative acceptability of each network path for the end user's communication needs, such as bandwidth and reliability. At step 50 candidate network paths are selected from the available network paths based upon acceptable network performance. Network performance includes a number of factors as described above, including available bandwidth, available communication bands, network traffic, latency, distances between nodes, types of nodes and the amount of data that the portable information handling system needs to transfer.

Once candidate network paths are identified, the process continues to step 58 to select an optimal network path from amongst the candidate network paths based upon user experience and cost, such as a comparison of energy consumption parameters associated with each network path. If network connection experience evaluates as indistinguishable to the end user, then the lowest energy consumption parameter cost is preferred. If a lower network experience is available on a network path that suffices for the end user's current data transactions, the lower network experience may be selected if it provides improved energy consumption cost and the higher network connection experience is retained for use in the event the end user's data transaction needs increase. At step 60, a network connection is established with the selected network path and at step 62 the network service quality is evaluated. From step 62, periodic or event-based evaluations of the network interface are performed to ensure that network interface experience remains acceptable. At step 70 a determination is made of whether the network service quality has changed and, if so, the process returns to step 50. If network service remains acceptable, the process continues to step 64 to determine if communication is complete and, if so, the process ends at step 66. If at step 64 communication is not complete, the process continues to step 68 to wait for an evaluation time to pass and then returns to step 62.

Figure 4:
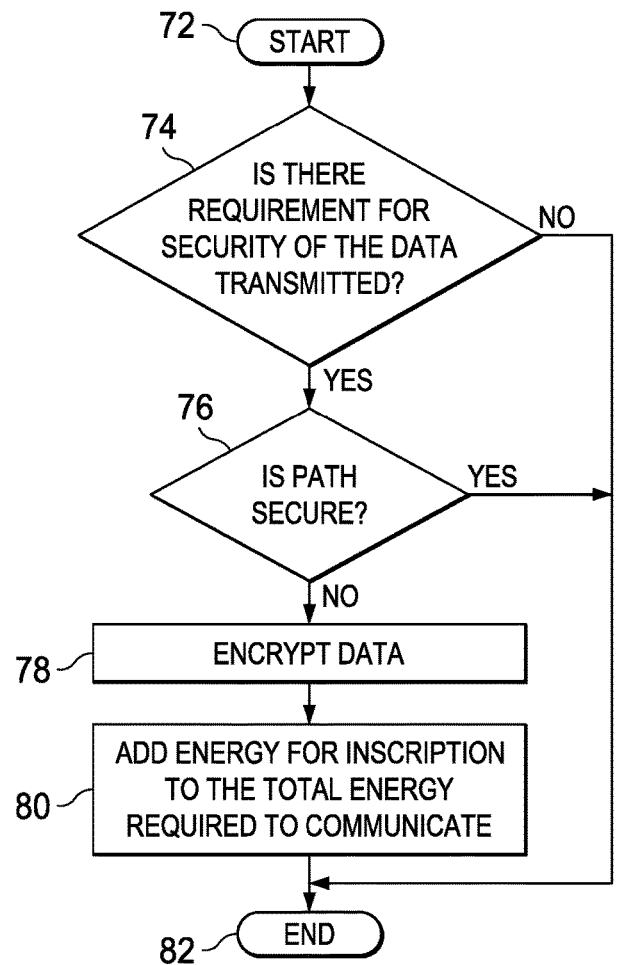
FIG. 4 depicts a flow diagram of a process for varying energy consumption based upon encryption needs of available network paths.

Referring now to FIG. 4, a flow diagram depicts a process for varying energy consumption based upon encryption needs of available network paths. The process starts at step 72 and at step 74 determines if a requirement exists for security of transmitted data on the network path. Encryption may be used to meet security requirements that arise due to security issues related to the nodes of the network path or due to the sensitivity of the information relative to the security of the network nodes. If security is not required at step 74, the process ends at step 82. If security is required at step 74, the process continues to step 76 to evaluate whether the network path has adequate security for the data. If the network path has adequate security, the process ends at step 82. If the network path does not have adequate security, the process continues to step 78 to encrypt the network data. At step 80, the projected energy associated with the network path is increased to account for the additional processing associated with data encryption and decryption and the process ends at step 84. Increasing network path power consumption cost due to increased processing associated with encryption is one example of how varying energy constraints associated with a network path impacts competitive selection of the network path relative other network paths, and other energy associated factors may be included.

Although the present invention has been described in detail, it should be understood that various changes, substitutions and alterations can be made hereto without departing from the spirit and scope of the invention as defined by the appended claims.

What is claimed is:

1. A portable information handling system comprising:
a portable housing; a processor disposed in the portable housing and operable to execute instructions to process information;
a memory disposed in the portable housing and interfaced with the processor, the memory operable to store the information;
a wireless network interface device interfaced with the processor and operable to communicate information as wireless signals to one or more external wireless devices; and
a mesh network manager interfaced with the wireless network interface device and operable to determine plural wireless network paths to a network destination, each wireless network path having plural external nodes located external to the portable housing, each wireless network path having a context including at least the use of battery power at each of the plural external nodes, the mesh network manager retrieving the context from the plural external nodes, the mesh network manager selecting one of the plural network paths based at least in part upon the use of battery power by the plural external nodes, and
an encryption manager operable to selectively encrypt wireless communications based upon the context; wherein the mesh network manager estimates energy consumption parameters associated with each of the plural network paths based at least in part on whether communications are encrypted at external network nodes and applies the energy consumption parameters to select a network path, wherein the mesh network manager determines the context of each wireless network path by retrieving network context information from each external node of each wireless network path.

2. The portable information handling system of claim 1 wherein the context comprises quality of service aggregated across the external nodes of each wireless network path.

3. The portable information handling system of claim 1 wherein the context comprises wireless bands associated with each external node of each wireless network path.

4. The portable information handling system of claim 1 wherein in the context comprises wireless bandwidth consumption associated with an application executing on the processor.

5. The portable information handling system of claim 1 wherein the external nodes of the wireless network paths include at least one portable information handling system interfaced with the wireless network device in a peer-to-peer network interface.

6. A method for portable information handling system mesh network power management, the method comprising:
determining plural mesh network paths between the portable information handling system and a network destination, each mesh network path having one or more wireless nodes located external to the portable information handling system;
determining at the portable information handling system an energy consumption cost associated with each of the plural mesh network paths, the energy consumption cost including at least energy consumption of the wireless nodes to communicate through the mesh network paths to the network destination;
determining at the portable information handling system at least one wireless node runs on a battery power;
selecting at the portable information handling system one of the plural mesh network paths to communicate with the network destination based at least in part upon the energy consumption cost associated with each of the plural mesh network paths and whether wireless nodes of the plural mesh network paths are running on battery power;

determining an encryption requirement for one or more of the plural mesh network paths; and in response to determining the encryption requirement, adding energy consumption cost for encryption for each of the plural mesh network paths that require encryption including additional energy consumption by the network wireless nodes of the network paths that add encryption to communications of the network paths.

7. The method of claim 6 further comprising:

retrieving to the portable information handling system from each node of each path network context information; and applying the network context information to determine the energy consumption.

8. The method of claim 7 wherein at least one node comprises a docking station having a 60 GHz WLAN interface.

9. The method of claim 7 wherein at least one node comprises an AP having a WLAN interface.

10. The method of claim 7 wherein at least one node comprises a portable information handling system interfaced through an ad hoc network and the network context information includes at least a status for whether the portable information handling system is running on external power or battery power.

11. A portable information handling system wireless network interface device comprising:

at least one radio configured to communicate network information as wireless signals to one or more external radios;

a processor operable to manage operation of the at least one radio; and a mesh network manager stored in persistent memory and operable to execute on the processor, the mesh network manager interfaced with the at least one radio and operable to determine plural wireless network paths to a network destination, each wireless network path having at least one peer-to-peer network interface with an intermediate radio node located external to the portable information handling system, each wireless network path having a context having energy consumption associated with the at least one peer-to-peer network interface intermediate radio node, the context including a status of the at least one peer-to-peer network interface intermediate radio node as operating on battery power, the mesh network manager selecting one of the plural network paths based at least in part upon an energy consumption cost comparison between the plural network paths, the energy cost associated with communications through each of the plural wireless network paths including at least energy consumed by nodes of each wireless network path and the use of battery power by intermediate radio nodes of each wireless network path;

retrieve network context information from each intermediate external radio node;

apply the network context information to determine an encryption status of each network path; and apply the encryption status to determine the energy consumption cost associated with communications through each of the plural network paths.

12. The portable information handling system wireless network interface device of claim 11 wherein at least one wireless network path includes docking station radio node communication through a 60 GHzWLAN interface.

13. The portable information handling system wireless network interface device of claim 11 wherein at least one network path includes a display peripheral radio node communicating through a 60 GHz WLAN interface.

14. The portable information handling system wireless network interface device of claim 11 wherein the network context information comprises quality of service associated with each node of each wireless network path.

* * * * *